United States Patent
Tanno

(10) Patent No.: US 10,396,367 B2
(45) Date of Patent: Aug. 27, 2019

(54) FUEL CELL SEPARATOR

(71) Applicant: Nisshinbo Chemical Inc., Tokyo (JP)

(72) Inventor: Fumio Tanno, Chiba (JP)

(73) Assignee: NISSHINBO CHEMICALS INC., Tokyo (JP)

(*) Notice: Subject to any disclaimer, the term of this patent is extended or adjusted under 35 U.S.C. 154(b) by 104 days.

(21) Appl. No.: 15/505,291

(22) PCT Filed: Aug. 6, 2015

(86) PCT No.: PCT/JP2015/072369
§ 371 (c)(1),
(2) Date: Feb. 21, 2017

(87) PCT Pub. No.: WO2016/039052
PCT Pub. Date: Mar. 17, 2016

(65) Prior Publication Data
US 2018/0219231 A1    Aug. 2, 2018

(30) Foreign Application Priority Data

Sep. 8, 2014 (JP) ................................. 2014-182279

(51) Int. Cl.
| H01M 8/0226 | (2016.01) |
| C08G 59/50 | (2006.01) |
| C08G 59/62 | (2006.01) |
| C08L 63/04 | (2006.01) |
| H01M 8/0221 | (2016.01) |
| H01M 8/0234 | (2016.01) |
| H01M 8/0239 | (2016.01) |
| H01M 8/0243 | (2016.01) |
| H01M 8/1018 | (2016.01) |

(52) U.S. Cl.
CPC ...... *H01M 8/0226* (2013.01); *C08G 59/5073* (2013.01); *C08G 59/621* (2013.01); *C08L 63/04* (2013.01); *H01M 8/0221* (2013.01); *H01M 8/0234* (2013.01); *H01M 8/0239* (2013.01); *H01M 8/0243* (2013.01); *H01M 2008/1095* (2013.01)

(58) Field of Classification Search
None
See application file for complete search history.

(56) References Cited

U.S. PATENT DOCUMENTS

| 5,994,785 A * | 11/1999 | Higuchi ................. C08G 59/18 257/789 |
| 2003/0180597 A1* | 9/2003 | Sakamoto ........... H01M 8/0213 429/465 |
| 2005/0112441 A1* | 5/2005 | Iino ........................ B82Y 30/00 429/517 |
| 2006/0060824 A1* | 3/2006 | Yasumura ........... C08F 290/067 252/500 |
| 2009/0270565 A1* | 10/2009 | Tahara ................. H01M 8/0213 525/534 |
| 2011/0045377 A1 | 2/2011 | Tanno |

FOREIGN PATENT DOCUMENTS

| EP | 1785441 A1 | 5/2007 |
| EP | 2763223 A1 | 8/2014 |
| JP | 2004-75954 A | 3/2004 |
| JP | 2004-127646 A | 4/2004 |
| JP | 2009-158118 A | 7/2009 |
| JP | 2011-113810 A | 6/2011 |
| JP | 2011-204650 A | 10/2011 |
| JP | 2013-69605 A | 4/2013 |
| JP | 2014-096392 A | 5/2014 |
| WO | 2009/034870 A1 | 3/2009 |

OTHER PUBLICATIONS

Thermosetting Resins 13th Edition. Nippon Kayaku.*
Extended (Supplementary) European Search Report dated Mar. 14, 2018, issued in counterpart application No. 15840022.6. (6 pages).
International Search Report dated Nov. 10, 2015, issued in counterpart International Application No. PCT/JP2015/072369 (1 page).

* cited by examiner

*Primary Examiner* — Alix E Eggerding
(74) *Attorney, Agent, or Firm* — Westerman, Hattori, Daniels & Adrian, LLP

(57) ABSTRACT

Provided is a fuel cell separator obtained by molding a composition that contains an epoxy resin and a graphite powder, wherein: the epoxy resin contains a main resin, a curing agent, and a curing accelerator; the main resin contains a biphenyl novolak-type epoxy resin having an ICI viscosity of 0.03-0.12 Pa·s at 150° C.; and the curing agent is a novolak-type phenol resin having a weight-average molecular weight of 420-1,500 and a dispersion degree of 2.0 or less.

11 Claims, No Drawings

FUEL CELL SEPARATOR

TECHNICAL FIELD

This invention relates to a fuel cell separator.

BACKGROUND ART

Fuel cell separators, together with carrying out the roles of imparting electrical conductivity to each unit cell and of providing flow channels for the supply of fuel and air (oxygen) to the unit cells, also serve as boundary walls separating the unit cells. Characteristics required of a separator thus include high electrical conductivity, high impermeability to gases, chemical stability, heat resistance and hydrophilicity. Techniques known for increasing these characteristics include the methods disclosed in Patent Documents 1 to 5.

Patent Document 1, the object of which is to provide a method for producing a solid polymer fuel cell separator that can be stably used over a long period of time, discloses a method for producing a solid polymer fuel cell separator which is molded under heat and pressure from a composition containing a phenolic resin solution and graphite powder and the cured form of which has a saturation water uptake of 3% or less.

Patent Document 2, the object of which is to provide an excellent fuel cell separator that can be molded as a thin-walled separator, that has sufficient strength and flexibility, and moreover that has little variation in thickness even when it is of reduced thickness, discloses a fuel cell separator which is obtained by molding a composition containing a porous synthetic graphite material, an epoxy resin that includes a base resin and a curing agent, and an internal mold release agent, and which has an average thickness for the thin-walled regions of from 0.12 to 0.20 mm.

Patent Document 3, the object of which is to provide a resin composition for fuel cell separators that can reduce the fuel cell separator thickness, enhance the thickness accuracy, make the electrical conductivity more uniform and increase the mechanical strength, discloses a liquid resin composition for fuel cell separators which includes: (A) graphite particles; (B) an epoxy resin component made up of, as at least part of the epoxy resin within a thermosetting resin, an ortho-cresol novolak-type epoxy resin or an ortho-cresol novolak-type epoxy resin, and at least one resin selected from among bisphenol-type epoxy resins, biphenyl-type epoxy resins and phenol aralkyl-type epoxy resins having a biphenylene skeleton; (C) a curing agent consisting at least in part of a phenolic resin, and (D) a curing accelerator that consists at least in part of a substituted imidazole having a hydrocarbon group at the 2 position.

Patent Document 4, the object of which is to provide both a solid polymer fuel cell separator having excellent properties such as impermeability to gases, strength characteristics, electrical properties and mold release properties during molding, and also a method of manufacture thereof, discloses a fuel cell separator in which a phenolic resin containing at least 50% of a high para-novolak-type phenolic resin is used as an epoxy resin curing agent.

Patent Document 5, the object of which is to exhibit a high moisture resistance while maintaining such properties as a high glass transition temperature and a good continuous moldability, discloses a fuel cell separator in which 2,3-dihydro-1H-pyrrolo(1,2-a)benzimidazole is used as a curing accelerator.

Although the separator of Patent Document 1 has a low water uptake (saturation water uptake) when immersed for ten days in hot water at 80° C. of 0.4 to 0.6%, because this remains inadequate for sustained power generation by a fuel cell operating at generally from 60 to 80° C., drawbacks include decreased performance due to swelling of the separator from water absorption, and also cracking and breakage on account of non-uniform extension. Also, because hexamine is used in the phenolic resin curing agent, the ammonium ions that form as a result of hexamine decomposition dissolve out during operation of the fuel cell, leading to a decline in fuel cell output and reduced stability in sustained power generation.

In Patent Document 2, a separator that has a thickness of 0.2 mm or less and excellent mechanical strength is obtained. In Patent Document 3, a thin separator of good thickness accuracy having a thickness of from 0.2 to 0.6 mm and a thickness variation of within ±15 μm is obtained. However, because both of these separators use an ortho-cresol novolak-type epoxy resin having a high water uptake as the main ingredient of the binder resin, decreased performance and failure arise due to water uptake by the separator during sustained power generation by the fuel cell.

The separators in Patent Documents 4 and 5 make use of, as examples of the epoxy resin employed, biphenyl novolak-type epoxy resins (phenol aralkyl-type epoxy resins with a biphenylene skeleton) having a low water uptake. Biphenyl novolak-type epoxy resins have a low water uptake because the concentration of polar groups that form during the curing reaction is low. On the other hand, because the crosslink density is low, they have a poor heat resistance, making it necessary to select a resin having a high molecular weight. However, high-molecular-weight resins have a high melt viscosity, and so the flowability of the composition during molding is poor, resulting in a large variation in thickness and a high initial contact resistance.

In Patent Document 4, a high para-novolak-type phenolic resin is used as the curing agent. Because high-para novolak-type phenolic resins have a low crystallinity, the melt viscosity is high and the flowability of the composition during molding is poor, resulting in a large thickness variation and a high initial contact resistance. In Patent Document 5, slow-reacting 2,3-dihydro-1H-pyrrolo(1,2-a)benzimidazole is used as the curing accelerator, and so formation takes a full 2 minutes, which is a problem in terms of productivity.

PRIOR ART DOCUMENTS

Patent Documents

Patent Document 1: JP-A 2004-127646
Patent Document 2: WO 2009/034870
Patent Document 3: JP-A 2011-113810
Patent Document 4: JP-A 2009-158118
Patent Document 5: JP-A 2011-204650

SUMMARY OF THE INVENTION

Problems to be Solved by the Invention

In light of the above, an object of this invention is to provide a fuel cell separator which has an excellent wet heat resistance and undergoes little change in contact resistance even after being exposed to a wet heat environment, and which moreover has an excellent thickness accuracy.

Means for Solving the Problems

The inventor has conducted extensive investigations in order to achieve the above object. As a result, he has discovered that this object can be achieved with a fuel cell separator obtained by molding a composition which includes an epoxy resin containing a biphenyl novolak-type epoxy resin of a specific ICI viscosity as the base resin and a specific phenolic resin-containing epoxy resin as the curing agent, and also includes graphite powder.

Accordingly, this invention provides the following fuel cell separators.

1. A fuel cell separator obtained by molding a composition comprising an epoxy resin and graphite powder, which separator is characterized in that
   the epoxy resin includes a base resin, a curing agent and a curing accelerator;
   the base resin includes a biphenyl novolak-type epoxy resin having an ICI viscosity at 150° C. of from 0.03 to 0.12 Pa·s; and
   the curing agent is a novolak-type phenolic resin having a weight-average molecular weight of from 420 to 1,500 and a dispersity of 2.0 or less.
2. The fuel cell separator of 1 above, wherein the proportion of biphenyl novolak-type epoxy resin in the base resin of the epoxy resin is at least 50 wt %.
3. The fuel cell separator of 1 or 2 above, wherein the curing accelerator consists solely of an imidazole compound of formula (2) below

[Chemical Formula 1]

(2)

wherein $R^1$ to $R^3$ are each a hydrogen atom, an alkyl group of 1 to 20 carbon atoms which may include a substituent, an aromatic group of 6 to 20 carbon atoms which may include a substituent, an alkoxy group of 1 to 20 carbon atoms which may include a substituent, or a phenoxy group which may include a substituent; and $R^4$ is an alkyl group of 1 to 20 carbon atoms which may include a substituent, an aromatic group of 6 to 20 carbon atoms which may include a substituent, an alkoxy group of 1 to 20 carbon atoms which may include a substituent, or a phenoxy group which may include a substituent.

4. The fuel cell separator of any one of 1 to 3 above, wherein the graphite powder is a synthetic graphite powder.

Advantageous Effects of the Invention

The fuel cell separator of the invention has an excellent resistance to wet heat, and moreover maintains such wet heat resistance for a long time. That is, because the separator undergoes little change in contact resistance even after prolonged exposure to a wet heat environment, fuel cells equipped with the fuel cell separator of the invention are able to maintain a stable power generating efficiency over a long period of time.

EMBODIMENT FOR CARRYING OUT THE INVENTION

The fuel cell separator of the invention is obtained by molding a composition containing graphite powder and an epoxy resin (which composition is referred to below as the "fuel cell separator composition").

[Fuel Cell Separator Composition]

The graphite powder included in the fuel cell separator composition may be a natural graphite or synthetic graphite. Vein graphite or a synthetic graphite powder obtained by spheroidizing vein graphite is especially preferred. The graphite powder has a mean particle size $d_{50}$ of preferably from 20 to 100 μm, and more preferably from 30 to 80 μm. At a mean particle size $d_{50}$ below 20 μm, a thermosetting resin readily covers the surface of the graphite material and the surface area of contact between particles becomes smaller, as a result of which the electrical conductivity of the separator itself may worsen. At a mean particle size greater than 100 μm, the surface area of contact between the graphite particles and the thermosetting resin becomes smaller and so a sufficient mechanical strength may not be attainable. The mean particle size $d_{50}$ in this invention refers to the median diameter in particle size analysis by the laser diffraction method.

For a fuel cell separator to exhibit a sufficient strength even when it is thin-walled, a porous synthetic graphite material containing not more than 1 wt % of graphite particles up to 1 μm in size and containing not more than 1 wt % of graphite particles at least 300 μm in size is more preferred. A synthetic graphite material in which the content of particles up to 3 μm in size is not more than 1 wt % and the content of particles at least 250 μm in size is not more than 1 wt % is best.

The specific surface area of the graphite powder is preferably from 1 to 5 m²/g. At a specific surface area for the graphite powder of less than 1 m²/g, compatibility between the graphite material and the resin worsens and sufficient strength may not be obtained. On the other hand, at a specific surface area for the graphite powder of more than 5 m²/g, the graphite material ends up absorbing the resin, thus worsening the flowability of the molding material. As a result, the thickness accuracy may worsen and the contact resistance may increase. Moreover, the graphite material ends up absorbing both water that forms in association with the cell reactions by the fuel cell and cooling water, giving rise to warping of the separator, as a result of which the contact resistance may increase.

The epoxy resin within the composition for a fuel cell separator includes a base resin, a curing agent and a curing accelerator.

The base resin includes a biphenyl novolak-type epoxy resin. The biphenyl novolak-type epoxy resin is preferably one of formula (1) below.

[Chemical Formula 2]

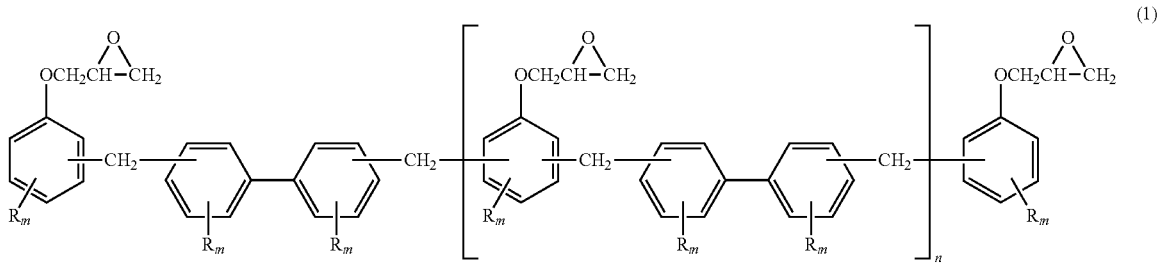

In this formula, each R is independently a halogen atom or an alkyl group of 1 to 4 carbon atoms, each m is independently an integer from 0 to 4, and n is an integer of at least 0.

Examples of the halogen atom include fluorine, chlorine, bromine and iodine atoms. The alkyl group of 1 to 4 carbon atoms may be linear, branched or cyclic, and is exemplified by methyl, ethyl, n-propyl, isopropyl, cyclopropyl, n-butyl, isobutyl, sec-butyl, tert-butyl and cyclobutyl groups.

The subscript "m" is preferably 0 or 1, and more preferably 0. The subscript "n" is not particularly limited, provided it is a number such that the biphenyl novolak-type epoxy resin satisfies the subsequently described ICI viscosity. Because the ICI viscosity varies also with the structure of R and the value of m, the value of n cannot be strictly specified, although n is generally about 0 to 3.

In order to further increase the heat resistance of the resulting fuel cell separator and also provide a good molding processability, the biphenyl novolak-type epoxy resin has an ICI viscosity at 150° C. of preferably from 0.03 to 0.12 Pa·s, and more preferably from 0.05 to 0.11 Pa·s. By using an epoxy resin having an ICI viscosity in this range, the resin has an appropriate molecular weight. The resulting fuel cell separator thus has a good heat resistance, in addition to which the resin flowability is good, making it possible to lower the molding pressure and otherwise improve the molding processability. At an ICI viscosity at 150° C. which is greater than 0.12 Pa·s, the flowability of the composition during molding worsens, resulting in an increased thickness variation, in addition to which the initial contact resistance may increase. The productivity may also decline.

The biphenyl novolak-type epoxy resin has an epoxy equivalent weight which, to further increase the heat resistance of the resulting fuel cell separator, is preferably from 260 to 290 g/eq. By using an epoxy resin having an epoxy equivalent weight in this range, the resin has an appropriate molecular weight and the crosslink density of the cured product increases. As a result, the heat resistance of the resulting fuel cell separator can be improved even further.

The base resin of the epoxy resin may additionally include an epoxy resin other than the above biphenyl novolak-type epoxy resin (which additional epoxy resin is referred to below as the "other epoxy resin"). The other epoxy resin is not particularly limited; various epoxy resins that have hitherto been used in the molding of separators may be used as the other epoxy resin. Illustrative examples include o-cresol novolak-type epoxy resins, phenol novolak-type epoxy resins, biphenyl-type epoxy resins, dicyclopentadiene-type epoxy resins, naphthalene-type epoxy resins, bisphenol A-type epoxy resins and bisphenol F-type epoxy resins. These may be used singly or two or more may be used in combination.

The ICI viscosity of the other epoxy resin is preferably from 0.01 to 0.3 Pa·s.

From the standpoint of lowering the melt viscosity of the resulting separator resin composition and lessening moisture uptake by the separator, the proportion of biphenyl novolak-type epoxy resin in the base resin is preferably at least 50 wt %, more preferably at least 70 wt %, and even more preferably 100 wt %. By setting the proportion to at least 50 wt %, the hot water resistance of the resulting fuel cell separator rises, making it possible to prevent decreases in electrical conductivity and strength during fuel cell operation over a long period of time. At a biphenyl novolak-type epoxy resin proportion within the base resin of the epoxy resin below 50 wt %, the hot water resistance may decrease.

The curing agent included in the epoxy resin is a phenolic resin, specific examples of which include novolak-type epoxy resins, cresol novolak-type phenolic resins, resole-type phenolic resins, aralkyl-modified phenolic resins, biphenyl novolak-type phenolic resins and trisphenolmethane-type phenolic resins. Of these, novolak-type phenolic resins are preferred. These may be used singly or two or more may be used in combination.

The novolak-type phenolic resin has a weight-average molecular weight (Mw) of from 420 to 1,500, and a dispersity (Mw/Mn, Mn being the number-average molecular weight) that is preferably 2.0 or less. At an Mw less than 420, the glass transition point may become lower and the heat resistance may worsen. On the other hand, at an Mw greater than 1,500, the ICI viscosity at 150° C. rises, as a result of which the flowability of the composition during molding may worsen. This may lead to a number of problems; namely, it may be impossible to mold thin-walled separators, the thickness variation may increase, and the initial contact resistance may rise. Also, at a dispersity greater than 2.0, the amount of monomer and dimer ingredients rises, which may result in a poor heat resistance.

To prevent the residual presence of unreacted ingredients, it is preferable for the curing agent to be included in an amount of preferably from 0.98 to 1.02 equivalents per equivalent of the base resin. By setting the curing agent content within this range, the amount of residual unreacted ingredients (base resin or curing agent) decreases, making it possible to prevent the problem of unreacted ingredients dissolving out during power generation by the fuel cell.

The curing accelerator included in the epoxy resin preferably consists solely of an imidazole compound of formula (2) below.

[Chemical Formula 3]

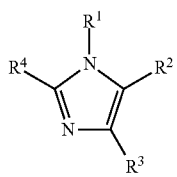

(2)

In the formula, $R^1$ to $R^3$ are each a hydrogen atom, an alkyl group of 1 to 20 carbon atoms which may include a substituent, an aromatic group of 6 to 20 carbon atoms which may include a substituent, an alkoxy group of 1 to 20 carbon atoms which may include a substituent, or a phenoxy group which may include a substituent. $R^4$ is an alkyl group of 1 to 20 carbon atoms which may include a substituent, an aromatic group of 6 to 20 carbon atoms which may include a substituent, an alkoxy group of 1 to 20 carbon atoms which may include a substituent, or a phenoxy group which may include a substituent.

To ensure the thermal stability of the fuel cell separator resin composition and a suitable level of activity as a curing accelerator during curing and molding, the imidazole compound has a molecular weight of preferably from 100 to 350, and more preferably from 140 to 180. At a molecular weight below 100, the thermal stability of the resin composition may worsen and curing may be too rapid, as a result of the specific shape of the mold may not be obtained. At a molecular weight above 350, the activity as a curing accelerator may decrease and curing may take a long time when curing and molding are carried out.

Such imidazole compounds are not particularly limited, although illustrative examples include 2-undecylimidazole (molecular weight, 224), 2-heptadecylimidazole (molecular weight, 307), 2-ethyl-4-methylimidazole (molecular weight, 110), 2-phenylimidazole (molecular weight, 144), 2-phenyl-4-methylimidazole (molecular weight, 158), 1-benzyl-2-methylimidazole (molecular weight, 172), 1-benzyl-2-phenylimidazole (molecular weight, 234), 1-cyanoethyl-2-methylimidazole (molecular weight, 135), 1-cyanoethyl-2-ethyl-4-methylimidazole (molecular weight, 163), 1-cyanoethyl-2-undecylimidazole (molecular weight, 275), 1-cyanoethyl-2-phenylimidazole (molecular weight, 197), 2-phenyl-4,5-dihydroxymethylimidazole (molecular weight, 204) and 2-phenyl-4-methyl-5-hydroxymethylimidazole (molecular weight, 188). Of these, preferred examples include 2-phenylimidazole, 2-phenyl-4-methylimidazole and 1-benzyl-2-methylimidazole. The imidazole compound may be of a single type, or two or more may be used in combination.

In order to have the curing reaction proceed efficiently and at a gradual rate, the amount of curing accelerator included is preferably from 0.65 to 1.02 parts by weight per 100 parts by weight of the combined amount of base resin and curing agent in the epoxy resin. At a curing accelerator content below 0.65 part by weight, the epoxy resin curing reaction may not proceed to a sufficient degree. On the other hand, at a content above 1.02 parts by weight, the curing reaction may proceed rapidly within the mold, leading to a rise in the melt viscosity. Moreover, the curing reaction may even proceed during storage.

The epoxy resin content in the fuel cell separator composition is preferably from 22 to 43 parts by weight, more preferably from 28 to 38 parts by weight, and even more preferably from 31 to 35 parts by weight, per 100 parts by weight of the graphite powder. At an epoxy resin content below 22 parts by weight, the flowability of the molding material may diminish too much, lowering the moldability, and the electrical conductivity of the resulting fuel cell separator may decrease. On the other hand, at a content above 43 parts by weight, the flowability of the molding material may become too large, lowering the moldability, and the excess binder ingredient may end up covering the graphite powder, thereby increasing the contact resistance and lowering the electrical resistance of the resulting fuel cell separator.

An internal mold release agent may be included in the fuel cell separator composition in order to enhance the mold release properties. The internal mold release agent is not particularly limited. Use can be made of various internal mold release agents that have hitherto been used in the molding of fuel cell separators. Examples of internal mold release agents include metallic soaps such as calcium stearate and zinc stearate, synthetic hydrocarbon waxes such as polyethylene wax, and long-chain fatty acids such as carnauba wax. These may be used singly or two or more may be used in combination.

The content of internal mold release agent, although not particularly limited, is preferably from 0.05 to 1 part by weight, more preferably from 0.1 to 0.8 part by weight, and even more preferably from 0.3 to 0.7 part by weight, per 100 parts by weight of graphite powder.

The fuel cell separator composition may be prepared by, for example, mixing together the graphite powder, the epoxy resin and, optionally, the curing accelerator and the internal mold release agent in any order and in specific proportions. The mixer used at this time may be, for example, a planetary mixer, a ribbon blender, a Loedige mixer, a Henschel mixer, a rocking mixer or a Nauta mixer.

[Fuel Cell Separator]

The fuel cell separator of the invention is obtained by molding the above fuel cell separator composition into the desired separator shape. The separator molding method is not particularly limited; use can be made of, for example, injection molding, transfer molding, compression molding, extrusion or sheet forming. When a mold is used during molding, it is desirable to use a mold for fuel cell separator production which is capable of forming, at the surface on one or both sides of the molded body, grooves that will serve as flow channels for the supply and removal of gases.

Of these methods, the use of compression molding is preferred for obtaining a separator of excellent accuracy and mechanical strength. The compression molding conditions are preferably a mold temperature of from 150 to 200° C., a molding pressure of from 10 to 50 MPa, and a molding time of from 15 to 60 seconds.

The surfaces of the fuel cell separator thus obtained may be subjected to an existing hydrophilizing treatment, such as blast treatment, plasma treatment, corona treatment, flame treatment or ultraviolet treatment. In addition, it is also possible to lower the surface resistance of the separator by shining a laser onto the separator to carry out surface treatment and thereby removing the resin component from the surface layer of the separator.

Because the fuel cell separator of the invention generally has a glass transition point of at least 100° C. and a low water uptake after hot water immersion treatment (1,000 hours of immersion at 90° C.) of 0.7% or less, the heat resistance and moisture resistance are high.

Moreover, because the fuel cell separator of the invention generally has an initial contact resistance of 12 $m\Omega \cdot cm^2$ or less, the percent change in contact resistance following hot water immersion treatment (1,000 hours of immersion at 90° C.) is 20% or less. Therefore, the power generating performance is good, and it is possible to maintain a good power generating performance over a long period of time.

Because the variation in thickness of the fuel cell separation is generally not more than 10% and the initial flexural strength is at least 40 MPa, the contact resistance with the electrodes is small and it is possible to assemble the fuel cell without breakage.

The fuel cell separator of the invention has a high heat resistance and a high hydrophilicity, in addition to which the hydrophilicity persists for a long time. Therefore, fuel cells provided with this separator are able to maintain a stable power generating efficiency for a long time. The inventive fuel cell separator having such properties is especially well-suited for use as a separator in solid polymer fuel cells.

A solid polymer fuel cell is generally composed of a stack of many unit cells, each unit cell being constructed of a solid polymer membrane disposed between a pair of electrodes that are in turn sandwiched between a pair of separators which form flow channels for the supply and removal of gases. The fuel cell separator of the invention may be used as some or all of the plurality of separators in the fuel cell.

EXAMPLES

Examples of the invention and Comparative Examples are given below by way of illustration and not by way of limitation.

Measurements and evaluations of various physical values and characteristics were carried out by the following methods.

[ICI Viscosity]

The ICI viscosity was measured at a plate temperature of 150° C. using an ICI cone and plate viscometer from Codex Corp.

[Mean Particle Size $d_{50}$]

The mean particle size was measured using a particle size analyzer (Microtrac MT3000, from Nikkiso Co., Ltd.).

[Thickness Variation]

The separator thickness was measured at 20 points on each separator with a micrometer (Digimatic PMU150-25DM, from Mitutoyo Corporation), and the average thickness was determined. The variation in thickness was calculated from the following formula.

Thickness variation (%)=[(maximum thickness−minimum thickness)/average thickness]×100

[Glass Transition Point]

Using a thermal analyzer (TMA 6100, from Seiko Instruments Inc.), measurement was carried out at a temperature rise rate of 1° C./min under a load of 5 g, and the inflection point in the resulting coefficient of thermal expansion curve was treated as the glass transition point.

[Hot Water Immersion Treatment]

Hot water immersion treatment was carried out by placing a test specimen and deionized water in a 500 mL fluoropolymer container and heating at an inside temperature of 90° C. for 1,000 hours. The test specimen was then taken out of the container, the water adhering to the surface was removed with an air blower, and the test specimen was air dried for 1 hour at 23° C.

[Water Uptake after Hot Water Immersion]

The weight of a 100×20×2 mm test specimen cut from the separator was measured and this weight was treated as the initial weight. The hot water immersion treatment described above was carried out on this test specimen and the weight of the test specimen was again measured, giving the weight following hot water immersion. The water uptake after hot water immersion was calculated from the following formula.

Water uptake after hot water immersion (%)=[|weight after hot water immersion−initial weight|/initial weight]×100

This test was carried out on five test specimens cut from the same separator, and the average value for water uptake after hot water immersion was determined.

[Percent Change in Contact Resistance after Hot Water Immersion]

Two 30×30×2 mm test specimens cut from a separator were stacked together, one on top of the other, and copper electrodes were subsequently placed above and below the stacked specimens. Next, a surface pressure of 1 MPa was applied vertically to the resulting assembly and the voltage was measured by the four-probe method. The contact resistance was calculated from the following formula. This result was treated as the initial contact resistance.

Contact resistance (mΩ·cm$^2$)=(voltage×surface area of contact)/current

These test pieces for contact resistance measurement were placed in 500 mL of deionized water and the hot water immersion treatment described above was carried out, following which the contact resistance was measured. This result was treated as the contact resistance after hot water immersion. The percent change in contact resistance after hot water immersion with respect to the initial contact resistance was calculated from the following formula.

Change in contact resistance after hot water immersion (%)=[|contact resistance after hot water immersion−initial contact resistance|/initial contact resistance]×100

This test was carried out on five test specimens cut from the same separator, and the average percent change in contact resistance after hot water immersion was determined.

[Percent Change in Flexural Strength after Hot Water Immersion]

Using a 100×20×2 mm test specimen cut from a separator, a three-point bending test was carried out in general accordance with JIS K 6911 ("General Test Methods for Thermosetting Plastics") at a distance between support points of 40 mm, and the result was treated as the initial bending strength. The test specimen was then placed in 500 mL of deionized water and the hot water immersion treatment described above was carried out, following which the flexural strength was measured, giving the flexural strength following hot water immersion. The percent change in flexural strength following hot water immersion with respect to the initial flexural strength was calculated from the following formula.

Change in flexural strength after hot water immersion (%)=[|flexural strength after hot water immersion−initial flexural strength|/initial flexural strength]×100

This test was carried out on each of five test specimens, both initially and after hot water immersion, and the average percent change in flexural strength after hot water immersion was determined.

Working Examples 1 to 4, Comparative Examples 1 to 5

In each Example, a fuel cell separator composition was prepared by charging the following ingredients in the amounts shown in Table 1 into a Henschel mixer and mixing them together for 3 minutes at 500 rpm: synthetic graphite powder as the graphite powder, biphenyl novolak-type epoxy resin as the base resin of the epoxy resin, novolak-type phenolic resin as the curing agent of the epoxy resin, 2-phenylimidazole as the curing accelerator, and carnauba wax as the internal mold release agent.

The resulting composition was poured into a 200×200×2 mm mold for fuel cell separator production and compression-molded at a mold temperature of 185° C., a molding pressure of 30 MPa and a molding time of 30 seconds to give a fuel cell separator.

Working Examples 5 to 8, Comparative Examples 6 and 7

In each Example, a fuel cell separator composition was prepared by charging the following ingredients in the amounts shown in Table 2 into a Henschel mixer and mixing them together for 3 minutes at 500 rpm: synthetic graphite powder as the graphite powder, biphenyl novolak-type epoxy resin, ortho-cresol novolak-type epoxy resin and/or phenol novolak-type epoxy resin as the base resin of the epoxy resin, novolak-type phenolic resin as the curing agent of the epoxy resin, 2-phenylimidazole as the curing accelerator, and carnauba wax as the internal mold release agent.

The resulting composition was poured into a 200×200×2 mm mold for fuel cell separator production and compression-molded at a mold temperature of 185° C., a molding pressure of 30 MPa and a molding time of 30 seconds to give a fuel cell separator.

The synthetic graphite powder, biphenyl novolak-type epoxy resin, ortho-cresol novolak-type epoxy resin, phenol novolak-type epoxy resin and novolak-type phenolic resin used in the respective Working Examples and Comparative Examples were as follows.

Synthetic Graphite Powder:
   mean particle size $d_{50}$, 50 μm; specific surface area, 2.3 $m^2/g$ Biphenyl Novolak-Type Epoxy Resin:
   NC-3000 from Nippon Kayaku Co., Ltd. (Working Examples 1 to 8 and Comparative Examples 3 to 5),
   NC-3000L from Nippon Kayaku Co., Ltd. (Comparative Example 1), and
   NC-3000H from Nippon Kayaku Co., Ltd. (Comparative Example 2)

Ortho-Cresol Novolak-Type Epoxy Resin:
   EOCN-1020-65 from Nippon Kayaku Co., Ltd. (Working Examples 6 to 8), and
   N-655-EXP-S from DIC Corporation (Comparative Example 6)

Phenol Novolak-Type Epoxy Resin:
   EPPN-201 from Nippon Kayaku Co., Ltd. (Comparative Example 7)

Novolak-Type Phenolic Resin:
   from Showa Denko K.K. (Working Examples 1, 2, 4, 5-8, Comparative Examples 1, 2, 6, 7) and
   Meiwa Plastic Industries, Ltd. (Working Example 3, Comparative Example 4)

Using the fuel cell separators obtained in the respective Working Examples and Comparative Examples, the thickness variation, glass transition point, water uptake after hot water immersion, initial contact resistance and percent change in contact resistance, and the initial flexural strength and percent change in flexural strength were measured by the methods described above. The results are presented in Tables 1 and 2.

TABLE 1

| | | | | Working Example | | | | Comparative Example | | | | |
|---|---|---|---|---|---|---|---|---|---|---|---|---|
| | | | | 1 | 2 | 3 | 4 | 1 | 2 | 3 | 4 | 5 |
| Graphite powder | | | Content (pbw) | 100 | 100 | 100 | 100 | 100 | 100 | 100 | 100 | 100 |
| Epoxy resin | Base resin | Biphenyl novolak-type epoxy resin | Epoxy equivalent weight (g/eq) | 270 | 284 | 270 | 270 | 261 | 282 | 270 | 270 | 270 |
| | | | ICI viscosity (Pa·s) | 0.05 | 0.11 | 0.05 | 0.05 | 0.02 | 0.26 | 0.05 | 0.05 | 0.05 |
| | | | Content (pbw) | 22.8 | 22.9 | 22.8 | 22.8 | 22.3 | 22.5 | 22.8 | 22.8 | 22.8 |
| | Curing agent | Novolak-type phenolic resin | Hydroxyl equivalent weight (g/eq) | 105 | 105 | 105 | 105 | 105 | 105 | 104 | 105 | 106 |
| | | | ICI viscosity (Pa·s) | 0.10 | 0.10 | 0.12 | 0.20 | 0.10 | 0.10 | 0.04 | 0.60 | 0.80 |
| | | | Mw | 486 | 486 | 685 | 939 | 486 | 486 | 397 | 981 | 1564 |
| | | | Mn | 383 | 383 | 427 | 498 | 383 | 383 | 291 | 462 | 828 |
| | | | Mw/Mn | 1.3 | 1.3 | 1.6 | 1.9 | 1.3 | 1.3 | 1.4 | 2.1 | 1.9 |
| | | | Content (pbw) | 9.0 | 8.6 | 9.0 | 9.0 | 9.0 | 8.5 | 8.9 | 9.0 | 9.0 |
| | Equivalent weight ratio between base resin and curing agent | | | 1.0 | 1.0 | 1.0 | 1.0 | 1.0 | 1.0 | 1.0 | 1.0 | 1.0 |
| | Curing accelerator | | Content (pbw) | 0.3 | 0.3 | 0.3 | 0.3 | 0.3 | 0.3 | 0.3 | 0.3 | 0.3 |
| Internal mold release agent | | | Content (pbw) | 0.2 | 0.2 | 0.2 | 0.2 | 0.2 | 0.2 | 0.2 | 0.2 | 0.2 |
| Thickness variation (%) | | | | 2.2 | 4.0 | 2.8 | 3.2 | 1.6 | 8.2 | 4.1 | 4.3 | 8.6 |
| Glass transition point (° C.) | | | | 132 | 141 | 127 | 144 | 108 | 146 | 108 | 118 | 148 |
| Water uptake after hot water immersion (%) | | | | 0.3 | 0.3 | 0.4 | 0.3 | 0.3 | 0.5 | 0.5 | 0.4 | 0.4 |
| Contact resistance | | Initial contact resistance (mΩ·$cm^2$) | | 4 | 4 | 4 | 4 | 3 | 6 | 4 | 5 | 9 |
| | | Percent change (%) | | 4 | 4 | 5 | 5 | 4 | 5 | 5 | 6 | 6 |
| Flexural strength | | Initial flexural strength (MPa) | | 62 | 64 | 60 | 61 | 58 | 64 | 62 | 57 | 59 |
| | | Percent change (%) | | 3 | 3 | 3 | 5 | 3 | 4 | 5 | 5 | 5 |

When the ICI viscosity at 150° C. of the biphenyl novolak-type epoxy resin was in the range of 0.03 to 0.12 Pa·s and the curing agent had an Mw of from 450 to 1,500 and a dispersity of 2.0 or less, the resulting separators, compared with separators produced from compositions that fell outside of these ranges, had a good moldability, a small variation in thickness and a glass transition point for the molded body that was sufficiently high (Working Examples 1 to 4).

TABLE 2

|  |  |  |  | Working Example |  |  |  | Comparative Example |  |
|---|---|---|---|---|---|---|---|---|---|
|  |  |  |  | 5 | 6 | 7 | 8 | 6 | 7 |
| Graphite powder |  |  | Content (pbw) | 100 | 100 | 100 | 100 | 100 | 100 |
| Epoxy resin | Base resin | Biphenyl novolak-type epoxy resin | Epoxy equivalent weight (g/eq) | 276 | 276 | 276 | 276 | — | — |
|  |  |  | ICI viscosity (Pa·s) | 0.08 | 0.08 | 0.08 | 0.08 | — | — |
|  |  |  | Content (pbw) | 23.1 | 15.7 | 10.7 | 6.3 | — | — |
|  |  | Ortho-cresol novolak-type epoxy resin | Epoxy equivalent weight (g/eq) | — | 204 | 204 | 204 | 202 | — |
|  |  |  | ICI viscosity (Pa·s) | — | 0.22 | 0.22 | 0.22 | 0.12 | — |
|  |  |  | Content (pbw) | — | 6.4 | 10.5 | 14.7 | 20.5 | — |
|  |  | Phenol novolak-type epoxy resin | Epoxy equivalent weight (g/eq) | — | — | — | — | — | 193 |
|  |  |  | ICI viscosity (Pa·s) | — | — | — | — | — | 0.38 |
|  |  |  | Content (pbw) | — | — | — | — | — | 20.3 |
|  |  | Proportion (%) of biphenyl-type resin in base resin |  | 100 | 71 | 50 | 30 | 0 | 0 |
|  | Curing agent | Novolak-type phenolic resin | Hydroxyl equivalent weight (g/eq) | 105 | 105 | 105 | 105 | 105 | 105 |
|  |  |  | ICI viscosity (Pa·s) | 0.10 | 0.10 | 0.10 | 0.10 | 0.10 | 0.10 |
|  |  |  | Mw | 486 | 486 | 486 | 486 | 486 | 486 |
|  |  |  | Mn | 383 | 383 | 383 | 383 | 383 | 383 |
|  |  |  | Mw/Mn | 1.3 | 1.3 | 1.3 | 1.3 | 1.3 | 1.3 |
|  |  |  | Content (pbw) | 8.8 | 9.3 | 9.6 | 10.0 | 10.7 | 11.2 |
|  | Equivalent weight ratio between base resin and curing agent |  |  | 1.0 | 1.0 | 1.0 | 1.0 | 1.0 | 1.0 |
|  | Curing accelerator |  | Content (pbw) | 0.3 | 0.3 | 0.3 | 0.3 | 0.3 | 0.3 |
| Internal mold release agent |  |  | Content (pbw) | 0.2 | 0.2 | 0.2 | 0.2 | 0.2 | 0.2 |
| Thickness variation (%) |  |  |  | 2.8 | 4.2 | 5.3 | 6.1 | 6.9 | 10.8 |
| Glass transition point (° C.) |  |  |  | 135 | 136 | 139 | 140 | 145 | 148 |
| Water uptake after hot water immersion (%) |  |  |  | 0.3 | 0.4 | 0.5 | 0.7 | 0.8 | 1.0 |
| Contact resistance |  | Initial contact resistance (mΩ·cm$^2$) |  | 4 | 4 | 5 | 6 | 6 | 8 |
|  |  | Percent change (%) |  | 4 | 5 | 7 | 10 | 12 | 14 |
| Flexural strength |  | Initial flexural strength (MPa) |  | 59 | 60 | 61 | 62 | 64 | 63 |
|  |  | Percent change (%) |  | 3 | 3 | 4 | 4 | 5 | 7 |

Separators produced from compositions that included a biphenyl novolak-type epoxy resin as a base resin of the epoxy resin, compared with separators produced from compositions that did not include a biphenyl novolak-type epoxy resin, had a low water uptake during hot water immersion. As a result, little change occurred in the contact resistance and flexural strength, and a good electrical conductivity and strength were maintained for a long period of time (Working Examples 5 to 8).

The invention claimed is:

1. A fuel cell separator obtained by molding a composition comprising an epoxy resin and graphite powder, which separator is characterized in that
the epoxy resin includes a base resin, a curing agent and a curing accelerator; the base resin consists of a biphenyl novolak-type epoxy resin having an ICI viscosity at 150° C. of from 0.03 to 0.12 Pa·s, and at least one selected from the group consisting of o-cresol novolak-type epoxy resin, phenol novolak type epoxy resin, biphenyl-type epoxy resin, dicyclopentadiene-type epoxy resin, naphthalene-type epoxy resin, bisphenol A-type epoxy resin and bisphenol F-type epoxy resin; and the curing agent is a novolak-type phenolic resin having a weight-average molecular weight of from 420 to 1,500 and a dispersity of 2.0 or less.

2. The fuel cell separator of claim 1, wherein the proportion of biphenyl novolak-type epoxy resin in the base resin of the epoxy resin is at least 50 wt %.

3. The fuel cell separator of claim 1, wherein the curing accelerator consists solely of an imidazole compound of formula (2) below

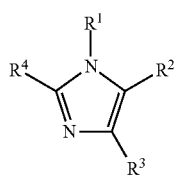

wherein $R^1$ to $R^3$ are each a hydrogen atom, an alkyl group of 1 to 20 carbon atoms which may include a substituent, an aromatic group of 6 to 20 carbon atoms which may include a substituent, an alkoxy group of 1 to 20 carbon atoms which may include a substituent, or a phenoxy group which may include a substituent; and $R^4$ is an alkyl group of 1 to 20 carbon atoms which may include a substituent, an aromatic group of 6 to 20 carbon atoms which may include a substituent, an alkoxy group of 1 to 20 carbon atoms which may include a substituent, or a phenoxy group which may include a substituent.

4. The fuel cell separator of claim 1, wherein the graphite powder is a synthetic graphite powder.

5. The fuel cell separator of claim 2, wherein the curing accelerator consists solely of an imidazole compound of formula (2) below

wherein $R^1$ to $R^3$ are each a hydrogen atom, an alkyl group of 1 to 20 carbon atoms which may include a substituent, an aromatic group of 6 to 20 carbon atoms which may include a substituent, an alkoxy group of 1 to 20 carbon atoms which may include a substituent, or a phenoxy group which may include a substituent; and $R^4$ is an alkyl group of 1 to 20 carbon atoms which may include a substituent, an aromatic group of 6 to 20 carbon atoms which may include a substituent, an alkoxy group of 1 to 20 carbon atoms which may include a substituent, or a phenoxy group which may include a substituent.

6. The fuel cell separator of claim 2, wherein the graphite powder is a synthetic graphite powder.

7. The fuel cell separator of claim 3, wherein the graphite powder is a synthetic graphite powder.

8. The fuel cell separator of claim 1, wherein the biphenyl novolak-type epoxy resin is represented by the following formula (1):

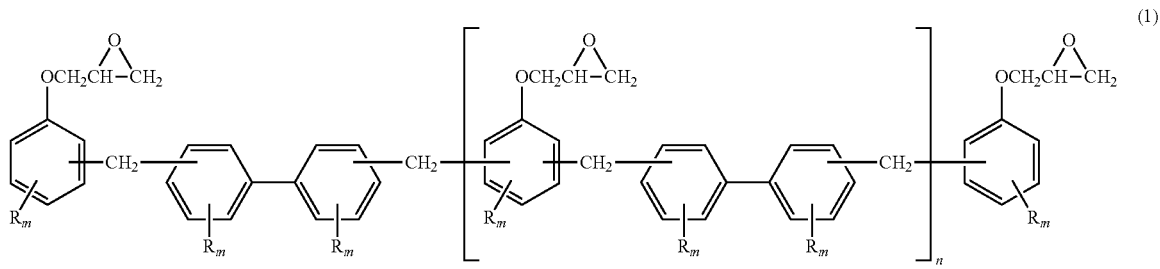

wherein each R is independently a halogen atom or an alkyl group of 1 to 4 carbon atoms, each m is independently an integer from 0 to 4, and n is an integer of at least 0.

9. The fuel cell separator of claim 1, wherein the graphite powder has a mean particle size $d_{50}$ of from 20 to 100 μm.

10. The fuel cell separator of claim 1, wherein the graphite powder is a porous synthetic graphite material containing not more than 1 wt % of graphite particles up to 1 μm in size and containing not more than 1 wt % of graphite particles at least 300 μm in size.

11. The fuel cell separator of claim 1, wherein the graphite powder has a specific surface area of from 1 to 5 $m^2/g$.

* * * * *